Figure 1:
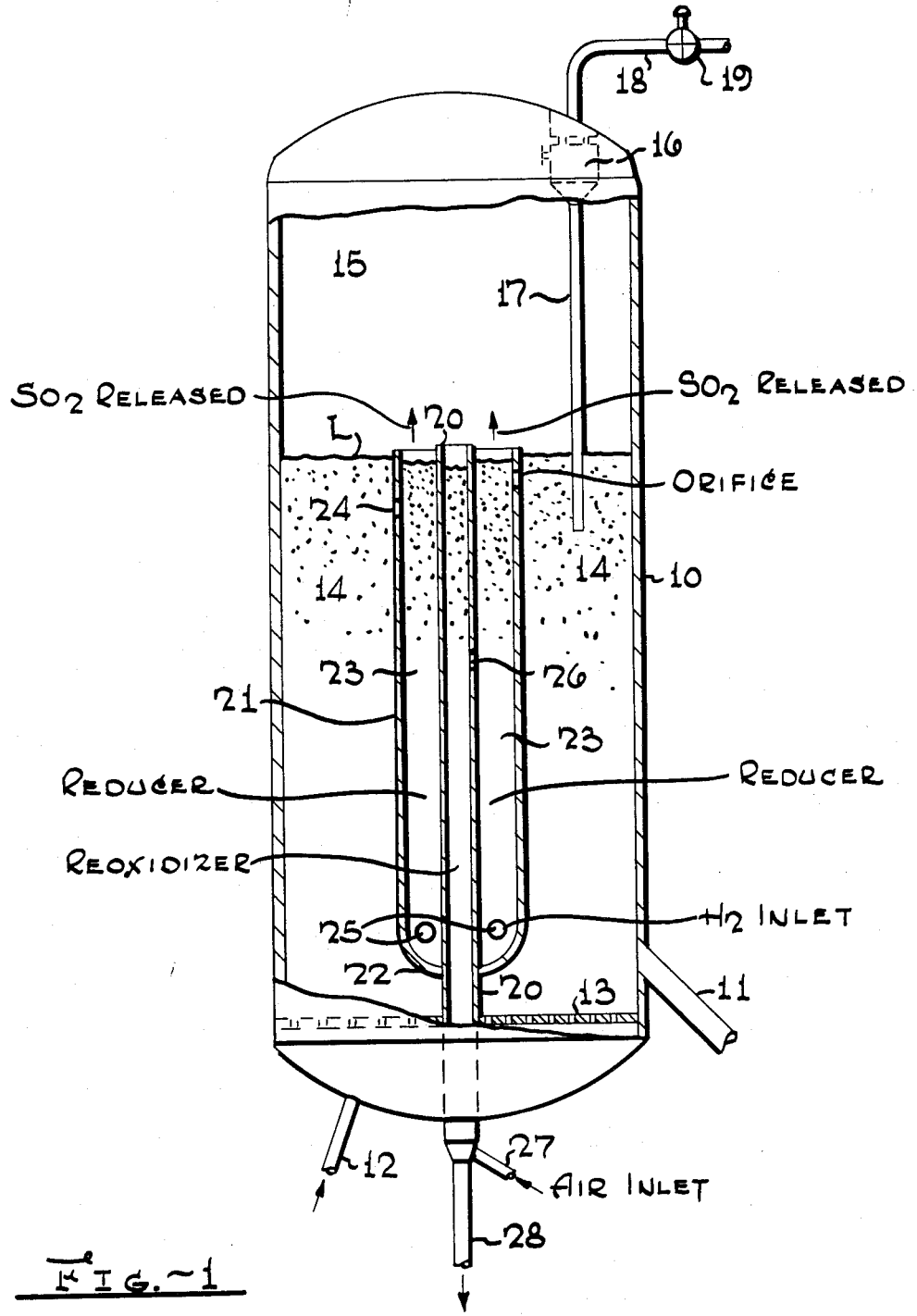

July 24, 1956 — R. J. FRITZ — 2,756,191
HYDROFORMING HIGH SULFUR FEED STOCKS
Filed Nov. 29, 1952 — 2 Sheets-Sheet 1

Robert J. Fritz Inventor
By H. H. Feyrer Attorney

July 24, 1956  R. J. FRITZ  2,756,191
HYDROFORMING HIGH SULFUR FEED STOCKS

Filed Nov. 29, 1952  2 Sheets-Sheet 2

Robert J. Fritz Inventor
By H. M. Feyrer Attorney

United States Patent Office 2,756,191
Patented July 24, 1956

2,756,191

HYDROFORMING HIGH SULFUR FEED STOCKS

Robert J. Fritz, Baton Rouge, La., assignor to Esso Research and Engineering Company, a corporation of Delaware Application November 29, 1952, Serial No. 323,222

7 Claims. (Cl. 196—50)

This invention pertains to hydrocarbon conversion processes and particularly to the reforming or hydroforming of lower boiling naphtha fractions of high sulfur content and low octane rating into low sulfur containing products, rich in aromatics and having good anti-knock properties, by the fluidized solids technique.

Hydroforming is a well known process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen, whereby the hydrocarbon fraction is increased in aromaticity through dehydrogenation of naphthenes and dehydrogenation and isomerization of the paraffins in which operation there is no net consumption of hydrogen. Hydroforming operations are ordinarily carried out in the presence of hydrogen or hydrogen-rich recycle gas (i. e. at relatively high hydrogen partial pressure) in the pressure range of from about 50 to 1000 lbs. per sq. inch, at temperatures of about 750–1150° F. and in contact with such catalysts as molybdenum oxide, chromium oxide or in general, oxides or sulfides of metals of groups IV to VIII of the periodic system of elements alone, or preferably supported on a carrier or spacing agent such as alumina gel, precipitated alumina or zinc aluminate spinel.

It has been proposed to effect the reforming or hydroforming of naphtha fractions in a fluidized solids reactor system in which naphtha vapors are passed continuously through a dense, fluidized bed of catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or reforming reaction zone. Fluid reforming or hydroforming as thus conducted has several fundamental advantages over fixed bed hydroforming such as (1) the operations are continuous, (2) the vessels can be designed for single rather than dual functions, (3) the reactor temperature is substantially constant throughout the dense bed, (4) the regeneration or reconditioning of the catalyst can be readily controlled and (5) the freshly regenerated catalyst can be utilized to carry at least part of the heat required for the reforming reaction from the regeneration zone into the reaction zone.

It has been found, however, that serious difficulties are encountered in the normal operation of a fluid hydroforming reactor system when a high sulfur content feed stock (a virgin naphtha containing about 0.12 wt. per cent sulfur) is charged to the unit. Analysis of the catalyst has shown that the sulfur is picked up in the reactor by the molybdenum in the catalyst as a sulfide. The sulfur-containing catalyst is then transported to the regenerator and the molybdenum sulfide formed in the reactor is roasted. A portion of the sulfide is converted in the roasting operation to SO₂ which is released in the regenerator vent gas whereas the sulfur remaining on the catalyst is converted to sulfates which are not removed on further oxidation. Since the regenerator fails to remove the sulfur completely there is a gradual increase in the amount of sulfur on the catalyst. It has been found that when the catalyst contains about 0.11 wt. per cent of sulfur the relative catalyst activity is about 80% and when the catalyst contains about 0.25 wt. per cent sulfur the relative catalyst activity is only about 50%. The relative catalyst activity is equal to w./hr./w. (wt. of oil/hr./wt. of catalyst in reactor) divided by the initial w./hr.w. to give a constant octane number. In other words when the catalyst has accumulated 0.25 wt. per cent of sulfur it is necessary to cut the feed rate in half in order to obtain a product of the desired octane number.

It is the object of this invention to provide the art with an improved fluid hydroforming process.

It is a further object of this invention to provide the art with an improved method of reforming high sulfur-containing feed stocks by the fluidized solids technique.

It is also an object of this invention to provide the art with a simple and effective method for inhibiting the accumulation of sulfur deposits upon hydroforming catalyst particles.

These and other objects will appear more clearly from the detailed specification and claims which appear below.

It has now been found that the amount of sulfur on a molybdenum oxide type catalyst used for the hydroforming of naphtha feed stocks containing sulfur can be minimized in a simple and effective manner by subjecting the catalyst to alternate oxidation and reduction in the regenerator. The initial oxidation or roasting of the spent catalyst in the regenerator converts a portion of the molybdenum sulfide to SO₂ which is released in the regenerator vent gas while the remaining sulfur on the catalyst is converted to molybdenum sulfate. By treating this regenerated catalyst with hydrogen or a hydrogen-rich gas a portion of the sulfate sulfur is reduced and released as SO₂. The hydrogen treated catalyst is then reoxidized before discharge from the regenerator at which time further amounts of sulfur are removed by oxidation of the reformed molybdenum sulfide to molybdenum oxide and sulfur dioxide. The reduction of the regenerated catalyst may desirably be effected in stages, using low hydrogen partial pressures in the first stage to reduce sulfates to sulfites and high hydrogen partial pressures in the second stage to reduce the sulfites to sulfides. The alternate oxidation and reduction should be carried out in the regenerator in order to avoid the effects of high catalyst to oil ratios that would be produced if the circulation of catalyst between the regenerator and the reactor was increased in an effort to achieve this alternate oxidation and reduction.

Reference is made to the accompanying drawing illustrating regenerators embodying the present invention in which Fig. 1 is a vertical cross section through a regenerator having a reducer and reoxidizer section arranged centrally.

Figure 3:
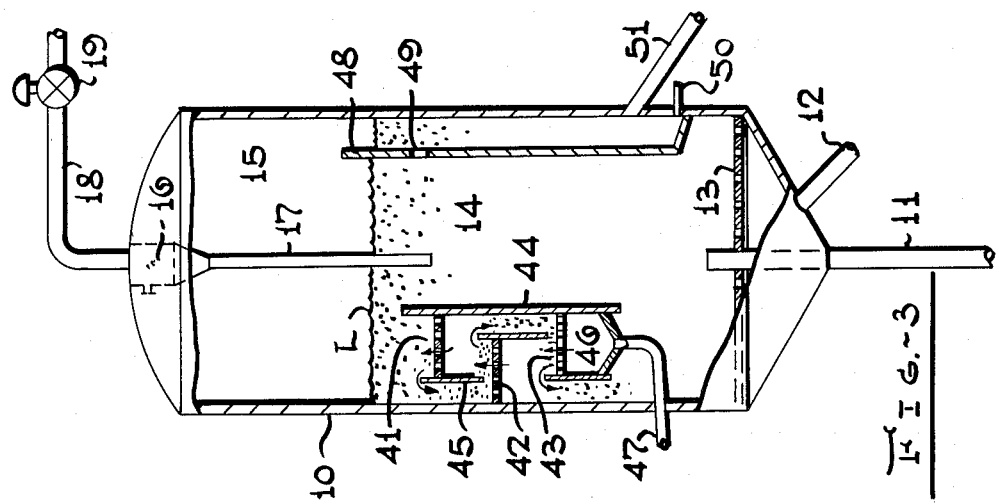
Figure 2:
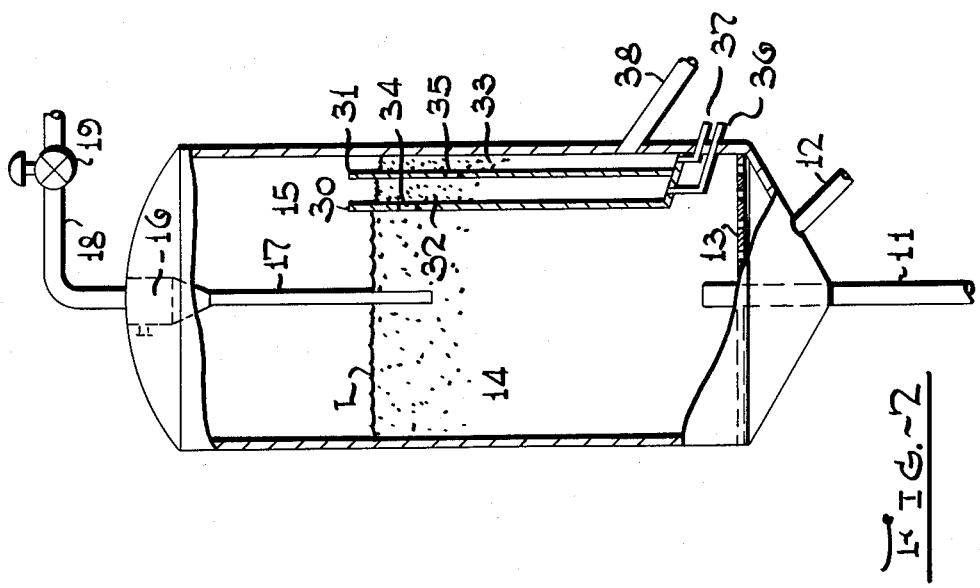

Fig. 2 is a vertical cross section through a modified regenerator with a reducing section and reoxidizing section interposed between the main regenerator dense bed and the regenerated catalyst withdrawal line, and, Fig. 3 is another embodiment in which several stages of reduction can be obtained with recycling of the reduced catalyst to the main regenerator dense bed.

Referring to Fig. 1, 10 is the main regenerator vessel which may be a vertical cylindrical vessel of considerable length or height. An inlet line 11 is connected to the lower part of the regenerator vessel for supplying a stream of spent reactor catalyst in a suitable carrier gas such as steam or air. If air is the carrier gas it is preferable that the amount of air be only a fraction of the air necessary for regeneration. The air or the major proportion of the air necessary for regeneration is supplied through the main air inlet line 12 in the bottom of the regenerator vessel 10. A perforated distributing plate or grid 13 is preferably arranged horizontally at the bottom of the regenerator vessel 10 to insure uniform distribution of the regeneration air over the entire cross section of the regenerator vessel. The velocity of the air passing upwardly through vessel 10 is so controlled as to maintain the catalyst particles undergoing regeneration as a dense, fluidized liquid simulating bed or mass 14 having a definite level L. The regeneration gases passing overhead entrain small amounts of catalyst particles forming a dilute or disperse phase 15 in the upper part of the regenerator vessel. The regeneration gases pass into cyclone separator 16 wherein the bulk of the entrained catalyst is separated by centrifugal action and returned to the dense bed 14 through dip leg 17. Regeneration gases substantially free of catalyst particles pass through outlet line 18 and pressure control valve 19 to a waste gas stack or to suitable scrubbing and storage equipment in the event that it is desired to utilize this gas for stripping purposes in the reactor system.

A conduit 20 is arranged centrally of the regenerator vessel 10 and extending downwardly through the bottom of the vessel. A cylindrical shell member 21 is arranged around the conduit 20, the lower end 22 of said shell member being secured to the conduit 20 to form an annular chamber 23. Orifices 24 are provided in the shell member 21 below the dense bed level L in order to permit passage of regenerated catalyst from dense bed 14 into the annular chamber 23. Hydrogen or hydrogen-rich recycle gas is supplied through inlet lines 25 for passage upwardly in contact with catalyst in annular chamber 23. An orifice 26 is provided in the wall of central conduit 20 for the discharge of hydrogen-treated catalyst into conduit 20. Air is introduced into the lower end of conduit 20 through air inlet line 27 for passage upwardly through conduit 20 for reoxidizing the hydrogen treated catalyst therein. Gases pass overhead from annular chamber 23 and from central conduit 20 into the dilute phase 15 where they are mixed with the regeneration gases and withdrawn therewith as described above.

The reoxidized catalyst is discharged from the base of conduit 20 into line 28 which may be standpipe or inlet end of a U-bend transfer line for conveying the regenerated, hydrogen-treated and reoxidized catalyst to the hydroforming reactor or to suitable means for pretreating the catalyst prior to the reintroduction of the regenerated catalyst into the hydroforming reactor.

Figs. 2 and 3 illustrate regenerators which are basically the same as the regenerator 10 of Fig. 1 and the same reference numerals have been applied for all of the common elements such as spent catalyst and air inlet lines, cyclone separator, dip pipe and regeneration vent gas outlet lines, etc. Figs. 2 and 3 differ from Fig. 1 in the arrangements for obtaining hydrogen treatment of the regenerator catalyst and reoxidation of the hydrogen-treated catalyst. These arrangements will therefore be described in detail.

In Fig. 2, an outer baffle member 30 and an inner baffle 31 are arranged to provide a primary treatment chamber or cell 32 between the baffle members and a secondary treatment chamber or cell 33 between the second baffle 31 and the inner wall of the regenerator vessel. An orifice 34 is provided in baffle member 30 below the dense bed level L for permitting discharge of catalyst from dense bed 14 into the primary treating chamber 32 and an orifice 35 is provided in baffle 31, preferably at a lower level than and off-set from orifice 34 for the discharge of catalyst from the primary treating chamber 32 into the secondary treating chamber 33. An inlet line 36 is connected to the bottom of the primary treating chamber 32 for supplying hydrogen or hydrogen-rich gas thereto and an inlet line 37 is connected to the bottom of chamber 33 for supplying oxygen-containing gas or air thereto. Catalyst is discharged from the secondary treating or reoxidizing zone 33 into catalyst withdrawal line 38 which discharges the catalyst into a pretreater or into a hydroforming reaction zone through a standpipe and dilute phase riser or U-bend transfer line or the like.

In Fig. 3, a plate column and downcomer arrangement is shown for effecting the hydrogen treatment of the regenerated or roasted catalyst. In this embodiment, hydrogen treatment is effected by arranging several perforated plates 41, 42 and 43 between the inner wall of the regenerator vessel and a baffle or wall member 44. A downcomer 45 is provided at each plate, the upper end of the downcomer acting as a weir to maintain a minimum bed or layer on each plate. Hydrogen or hydrogen-rich gas is supplied to a chamber 46 beneath the lowermost plate 43 through inlet line 47. The hydrogen or hydrogen-containing gas passes upwardly through the successive plates countercurrent to the catalyst which flows from the dense bed 14 over the upper end of baffle 44 and across the several plates 41, 42 and 43. The hydrogen-treated catalyst is discharged from the lowermost plate 43 back into the dense bed 14 where it becomes intermingled with catalyst undergoing oxidation or roasting and is again oxidized. Instead of providing plates and downcomers as shown, the hydrogen treating section may comprise a plurality of vertically spaced horizontal perforated plates of low pressure drop which permit the catalyst to pass downwardly countercurrent to an ascending stream of hydrogen-containing gas. In arrangements wherein the hydrogen treated catalyst is discharged into the main body of catalyst undergoing regeneration or oxidation, the effective circulation through the hydrogen treating section should be maintained at about two to three times the regenerated catalyst circulation rate.

A regenerated catalyst withdrawal well is provided by arranging a baffle member 48 on the inner wall of the regeneration vessel. An orifice 49 is provided in the baffle 48, below the dense bed level L to control the discharge of catalyst from the regenerator. Stripping gas such as steam, nitrogen or air may be introduced near the bottom of the withdrawal well through inlet line 50. Regenerated catalyst is discharged from the withdrawal well into regenerated catalyst transfer line 51 which conveys the catalysts to a pretreater or to a hydroforming reaction zone. The catalyst withdrawn through outlet line 51 in Fig. 3 or in the modification in which the hydrogen treated catalyst is discharged into the main regeneration zone dense bed is an equilibrium mixture of roasted or oxidized catalyst and catalyst that has been oxidized or roasted, reduced and reoxidized one or more times.

It will be understood that the regenerators in accordance with the present invention are used in combination with a fluidized solids reactor system of conventional design such as is shown in U. S. Serial No. 188,236, filed October 2, 1950, now U. S. Patent 2,689,823, dated September 21, 1953.

The feed or charging stock to the hydroforming reactor may be a virgin naphtha, a cracked naphtha, a Fischer-Tropsch naphtha or the like having a boiling range of about 125–450° F. or it may be a narrow boiling cut within this range. The modified regenerator of the present invention is particularly adapted for use when the above feed stocks have a relatively high content of sulfur, say about 0.10 wt. per cent sulfur or more. The feed stock is ordinarily preheated to about 800–1000° F. preferably about 950° F. Thermal degradation of the feed naphtha at preheat temperatures can be minimized by limiting the time of residence thereof in the transfer and feed inlet lines.

Hydrogen-rich gas or recycle gas containing about

50–80 volume per cent hydrogen is preheated to temperatures of about 1050–1200° F. and circulated through the reaction zone at a rate of from about 1000 to 8000 cu. ft. per barrel of naphtha feed.

The reactor system is charged with a mass of finely divided hydroforming catalyst particles. Suitable catalysts include group VI metal oxides such as molybdenum oxide, chromium oxide, tungsten oxide or vanadium oxide or mixtures thereof preferably dispersed upon a support or carrier such as activated alumina, zinc aluminate spinel or the like. Preferred catalysts contain about 5 to 15 wt. per cent molybdenum oxide or from about 10 to 40 wt. per cent chromium oxide upon a suitable carrier. If desired, minor amounts of stabilizers and promoters such as silica, calcium, ceria or potassia can be included in the catalyst. The catalyst particles are, for the most part, between 200 and 400 mesh in size or about 0–200 microns in diameter with a major proportion between 20 and 80 microns.

The hydroforming reactor vessel is operated at temperatures between about 850 and 950° F. and at pressures of from about 50 to about 500 pounds per sq. in. Small amounts of water vapor are present in the reaction zone, due principally to the presence of water in the feed and in the recycle gas and also due to the formation of water in the regeneration of the spent catalyst as well as the reduction of the regenerated catalyst in the pretreater or in the reactor vessel itself. The presence of these small amounts of water permits operation of the reactor at somewhat higher temperatures without loss in selectivity than is possible in systems lacking this small water partial pressure.

Regeneration of spent reactor catalyst is effected at substantially the same pressure as is maintained in the hydroforming reaction zone and at temperatures of about 1050–1200° F. The average residence time of the catalyst in the reactor is from about 3 to 4 hours while the average residence time of the catalyst in the regenerator is from about 5 minutes to 1 hour. The hydrogen treatment in the regenerator may be effected at or about regenerator temperature. However, since cooling of the regenerator is ordinarily necessary because all of the heat released in the regenerator can not be transferred to the reaction zone by the hot regenerated catalyst at the catalyst circulation rates normally applied without heating the catalyst to excessively high temperatures, the cooling coils may be so arranged in the regenerator as to control or lower the temperature of the catalyst particles undergoing hydrogen treatment. For example, the conduit 20 and/or the cylindrical shell member 21 of Fig. 1 or the baffle members 30 and 31 of Fig. 2 may be of hollow construction with suitable connections for circulating cooling fluid therethrough or cooling coils may be suitably arranged within the regenerator proper or within the hydrogen treating section.

The weight ratio of catalyst to oil introduced into the reactor should be about 0.5 to 5.0. It is ordinarily preferred to operate at catalyst to oil ratios of about 1.0 since higher ratios tend to give excessive carbon formation. Somewhat higher weight ratios can be used at higher pressures.

The space velocity or the weight in pounds of feed charged per hour per pound of catalyst in the reactor depends upon the age or activity level of the catalyst, the nature of the feed stock and the desired octane number of the product. Space velocity for a molybdenum oxide upon alumina gel catalyst may vary, for example, from about 1.5 w./hr./w. to about 0.15 w./hr./w.

The foregoing description contains a limited number of embodiments of the present invention. It will be understood, however, that this invention is not limited thereto since numerous variations are possible without departing from the scope of this invention.

What is claimed is:

1. In a process for reforming hydrocarbons boiling within the motor fuel range and containing at least about 0.1% sulfur in contact with finely divided catalyst particles comprising molybdenum oxide upon a support in accordance with the fluidized solids technique, the improvement which consists of continuously subjecting spent reactor catalyst particles to a treatment with an oxygen-containing gas, then to a treatment with a hydrogen-containing gas, and then to a further treatment with an oxygen-containing gas successively in a regeneration zone and recycling the thus treated molybdenum oxide-containing catalyst to the reforming zone.

2. In a process for reforming hydrocarbons boiling within the motor fuel range and containing at least about 0.1% sulfur in contact with finely divided catalyst particles comprising molybdenum oxide upon a support in accordance with the fluidized solids technique, the improvement which consists of continuously withdrawing a stream of spent reactor catalyst particles from the reforming reaction zone, subjecting the withdrawn reactor catalyst particles to a treatment with an oxygen-containing gas, then to a treatment with a hydrogen-containing gas, and then to a further treatment with an oxygen-containing gas successively in a regeneration zone and recycling the thus treated molybdenum oxide-containing catalyst to the reforming reaction zone.

3. In a process for reforming hydrocarbons boiling within the motor fuel range and containing at least about 0.1% sulfur in contact with finely divided catalyst particles comprising molybdenum oxide upon a support in accordance with the fluidized solids technique, the improvement which consists of continuously withdrawing a stream of spent reactor catalyst particles from a dense, fluidized bed of catalyst in a reforming reaction zone, transferring the spent reactor catalyst to a dense, fluidized bed of catalyst in a separate regeneration zone, passing oxygen-containing gas upwardly through the dense, fluidized bed of catalyst in the regeneration zone to effect oxidation of the contaminants upon the catalyst, treating oxidized catalyst particles with hydrogen, subjecting the hydrogen-treated catalyst to reoxidation by treating with oxygen-containing gas and recycling the reoxidized molybdenum oxide-containing catalyst to the reforming reaction zone.

4. The process as defined in claim 3 in which catalyst is circulated from the dense, fluidized bed in the regeneration zone into a confined zone where it is contacted with hydrogen-containing gas whereupon the hydrogen treated catalyst is discharged into the dense, fluidized bed in the regeneration zone.

5. The process as defined in claim 3 in which catalyst is circulated from the dense, fluidized bed in the regeneration zone into a confined zone where it is contacted with hydrogen-containing gas, discharging the hydrogen-treated catalyst into a second confined zone where it is contacted with an oxygen-containing gas, whereupon the reoxidized catalyst is recycled to the reaction zone.

6. The process as defined in claim 1 in which the treated catalyst particles are contacted with hydrogen-containing gas as they are recycled to the reforming reaction zone.

7. The process as defined in claim 1 in which the reoxidized catalyst particles are recycled to the reaction zone without contact with hydrogen-containing gas.

References Cited in the file of this patent

UNITED STATES PATENTS

| | | |
|---|---|---|
| 2,273,864 | Houdry | Feb. 24, 1942 |
| 2,357,332 | Kelly et al. | Sept. 5, 1944 |
| 2,390,244 | Finlayson | Dec. 4, 1945 |
| 2,472,844 | Munday et al. | June 14, 1949 |
| 2,498,559 | Layng | Feb. 21, 1950 |